(12) United States Patent
Good (10) Patent No.: US 7,766,161 B2
(45) Date of Patent: Aug. 3, 2010

(54) PORTABLE TOOL BOX

(76) Inventor: Jesse Maxwell Good, 19 Prospect St., New London, CT (US) 06320

( * ) Notice: Subject to any disclaimer, the term of this patent is extended or adjusted under 35 U.S.C. 154(b) by 126 days.

(21) Appl. No.: 11/706,826

(22) Filed: Feb. 12, 2007

(65) Prior Publication Data

US 2008/0190797 A1  Aug. 14, 2008

(51) Int. Cl.
B25H 3/00 (2006.01)
(52) U.S. Cl. ............... 206/349; 206/373; 280/47.17; 280/47.24; 312/249.8
(58) Field of Classification Search ............ 206/349, 206/373; 280/47.19, 47.17, 47.24, 47.26, 280/47.35; 312/351, 249.8, 249.13; 108/193, 108/189

See application file for complete search history.

(56) References Cited

U.S. PATENT DOCUMENTS

| 5,013,055 | A | | 5/1991 | Labrum | |
|---|---|---|---|---|---|
| 5,207,723 | A | * | 5/1993 | Newby, Sr. | 312/249.11 |
| 5,213,351 | A | * | 5/1993 | Chen | 280/47.19 |
| 5,224,531 | A | | 7/1993 | Blohm | |
| 5,244,221 | A | | 9/1993 | Ward | |
| 5,294,196 | A | * | 3/1994 | Chen | 312/263 |
| 5,378,005 | A | * | 1/1995 | Norton | 280/47.26 |
| 5,893,572 | A | * | 4/1999 | Parks | 280/47.18 |
| 5,906,381 | A | | 5/1999 | Hovatter | |
| 6,036,203 | A | | 3/2000 | Tyus et al. | |
| 6,149,168 | A | | 11/2000 | Pauser et al. | |
| 6,398,235 | B1 | * | 6/2002 | Cary | 280/47.26 |
| 6,808,185 | B1 | | 10/2004 | Brace | |
| 6,837,502 | B1 | | 1/2005 | Lee | |
| 6,837,665 | B2 | | 1/2005 | English, Jr. et al. | |
| 6,935,641 | B2 | * | 8/2005 | Hahn | 280/47.19 |
| 2005/0073119 | A1 | * | 4/2005 | Kirakosyan | 280/47.26 |
| 2006/0065563 | A1 | * | 3/2006 | Schmidt et al. | 206/372 |

OTHER PUBLICATIONS

IKEA, catalog, 2007, p. 308, IKEA USA.

* cited by examiner

*Primary Examiner*—Ehud Gartenberg
*Assistant Examiner*—Robert Poon
(74) *Attorney, Agent, or Firm*—Nicole Coppes-Gathy; Steven M. McHugh; Tobin, Carberry, O'Malley, Riley & Selinger (57) ABSTRACT

A portable tool box is disclosed. The portable tool box can be utilized in two positions by the user. The portable tool box has shelves coupled at an angle that is configured to retain the tools within the portable tool box during transport, while providing easy access when in use. The angled shelves allow the user to easily access the tools from the tool box when in the vertical position as well as in the horizontal position.

20 Claims, 7 Drawing Sheets

PORTABLE TOOL BOX

BACKGROUND

The present description relates to a device utilized in the transport and storage of tools that is convenient and portable. More particularly, the present description relates to a portable tool box having dual uses.

Conventional tool boxes are generally a box with a removable shelf that can be easily transported by hand. These tool boxes have a locking mechanism to hold the lid closed with a handle at the top. In order to carry the box, the owner would have to lift the box by the handle. Some of these tool boxes can be very large and can hold many tools. In lifting this cumbersome and heavy box, the owner may potentially hurt his back if not using careful lifting practices. But there are a finite number of tools that can be stored in a conventional tool box. Therefore, in order to carry a large number of tools necessary for a carpenter or construction worker to complete his job, he must have several tool boxes to hold all of his tools.

In order to transport tools to and from job sites, carpenters and construction workers must carry several tool boxes. In order to make the transport of tools easier, several carriers have been invented. U.S. Pat. No. 5,906,381 describes a tool storage and transport system that includes a tool box secured to a removable dolly assembly. U.S. Pat. No. 6,149,168 describes a wheeled tool case having a base with wheels, a frame, and a hollow case to hold tools. U.S. Pat. No. 5,013,055 describes a portable tool caddy having a generator. U.S. Pat. No. 6,036,203 describes a tool dolly having a hand truck frame with wheels and an attached cabinet.

None of the prior art tool boxes addresses the use of the tool box at the job site, or the optimum storage of the tools in the portable tool box. What is needed in the art is a portable tool box that can carry a large number of tools in an orderly and convenient manner and can be utilized in at least two different positions.

SUMMARY

The following presents a simplified summary of the present disclosure in order to provide a basic understanding of some aspects of the present disclosure. This summary is not an extensive overview of the present disclosure. It is not intended to identify key or critical elements of the present disclosure or to delineate the scope of the present disclosure. Its sole purpose is to present some concepts of the present disclosure in a simplified form as a prelude to the more detailed description that is presented herein.

The disclosure is directed toward a portable tool box. The portable tool box comprises a first side wall having an interior side and an exterior side; a rear wall having an interior side opposite an exterior side and a top opposite a bottom and is coupled to the interior side of the first side wall; a second side wall having an interior side opposite an exterior side and a top opposite a bottom and the rear wall is coupled to an interior side of the second side wall; a handle disposed between a top of the first wall and a top of the second wall; a base wall having an interior side opposite an exterior side and a top opposite a bottom and the base wall coupled to the bottom of the rear wall, to the interior side of the first side wall and to the interior side of the second side wall such that the base wall is coupled to the rear wall at an angle of about 45°; a base having an interior side opposite an exterior side and a top opposite a bottom, and the base is coupled to the bottom of the base wall, to the interior side of the first side wall and to the interior side of the second side wall; a top portion having an interior side opposite an exterior side coupled to the top of the rear wall, to the interior side of the first side wall and to the interior side of the second side wall; an interior formed from the first side wall, the second side wall, the rear wall, the top portion, the base wall and the base; a foot disposed to about the top of the rear wall such that the foot is configured to support weight of the portable tool box when the portable tool box is horizontal upon a surface; at least two wheels rotatably coupled to the bottom of the first side wall and the bottom of the second side wall such that the wheels are configured to support the weight of the portable tool box; at least one shelf disposed in the interior of said portable tool box, such that the shelf is positioned at an angle of about 45°; and at least one stabilizer coupled to the portable tool box such that the at least one stabilizer is configured to stabilize the portable tool box when in a vertical position.

A method of using a portable tool box is also disclosed. The method comprises grasping a handle of the portable tool box when positioned vertically. The portable tool box comprises a first side wall having an interior side and an exterior side; a rear wall having an interior side opposite an exterior side and a top opposite a bottom and is coupled to the interior side of the first side wall; a second side wall having an interior side opposite an exterior side and a top opposite a bottom and the rear wall is coupled to an interior side of the second side wall; a handle disposed between a top of the first wall and a top of the second wall; a base wall having an interior side opposite an exterior side and a top opposite a bottom and the base wall coupled to the bottom of the rear wall, to the interior side of the first side wall and to the interior side of the second side wall such that the base wall is coupled to the rear wall at an angle of about 45°; a base having an interior side opposite an exterior side and a top opposite a bottom, and the base is coupled to the bottom of the base wall, to the interior side of the first side wall and to the interior side of the second side wall; a top portion having an interior side opposite an exterior side coupled to the top of the rear wall, to the interior side of the first side wall and to the interior side of the second side wall; an interior formed from the first side wall, the second side wall, the rear wall, the top portion, the base wall and the base; a foot disposed to about the top of the rear wall such that the foot is configured to support weight of the portable tool box when the portable tool box is horizontal upon a surface; at least two wheels rotatably coupled to the bottom of the first side wall and the bottom of the second side wall such that the wheels are configured to support the weight of the portable tool box; at least one shelf disposed in the interior of said portable tool box, such that the shelf is positioned at an angle of about 45°; and at least one stabilizer coupled to the portable tool box such that the at least one stabilizer is configured to stabilize the portable tool box when in a vertical position. The method further comprises pulling on the handle to shift a weight of the portable tool box from the at least one stabilizer to the at least two wheels; moving the portable tool box to a desired location having a surface; and moving the portable tool box to shift a portion of the weight to the foot, wherein the foot rests upon the surface.

The present disclosure is also towards a portable tool box. The portable tool box comprising a rear wall coupled to a first side wall, a second side wall, and a base wall to form an interior and an exterior of the portable tool box such that the base wall is coupled at a 45 degree angle; a base is coupled to the base wall, the first side wall and the second side wall; a top portion is coupled to the rear wall, the first side wall and the second side wall; a foot is coupled to a top portion of the rear wall such that the foot is configured to support weight of the portable tool box when the portable tool box is horizontal upon a surface; at least two wheels rotatably coupled to the first side wall and the second side wall such that the wheels are configured to support the weight of the portable tool box; at least one shelf disposed in the interior of the portable tool box such that the shelf is positioned at an angle of 45°; and at least one stabilizer coupled to said portable tool box such that the stabilizer is configured to stabilize the portable tool box when in the vertical position.

BRIEF DESCRIPTION OF THE FIGURES

Referring now to the figures, wherein like elements are numbered alike.

DETAILED DESCRIPTION

Persons of ordinary skill in the art will realize that the following disclosure is illustrative only and not in any way limiting. Other embodiments of the invention will readily suggest themselves to such skilled persons having the benefit of this disclosure.

The present disclosure is a portable tool box that can be utilized in two positions by the user (or owner). The portable tool box has shelves configured to hold tools. The shelves are located within the portable tool box at an angle of about 35 to about 50 with about 45° preferred. The user can easily access the tools from the tool box when in the standing (or vertical) position as well as in the lying down (or horizontal) position.

Figure 1:
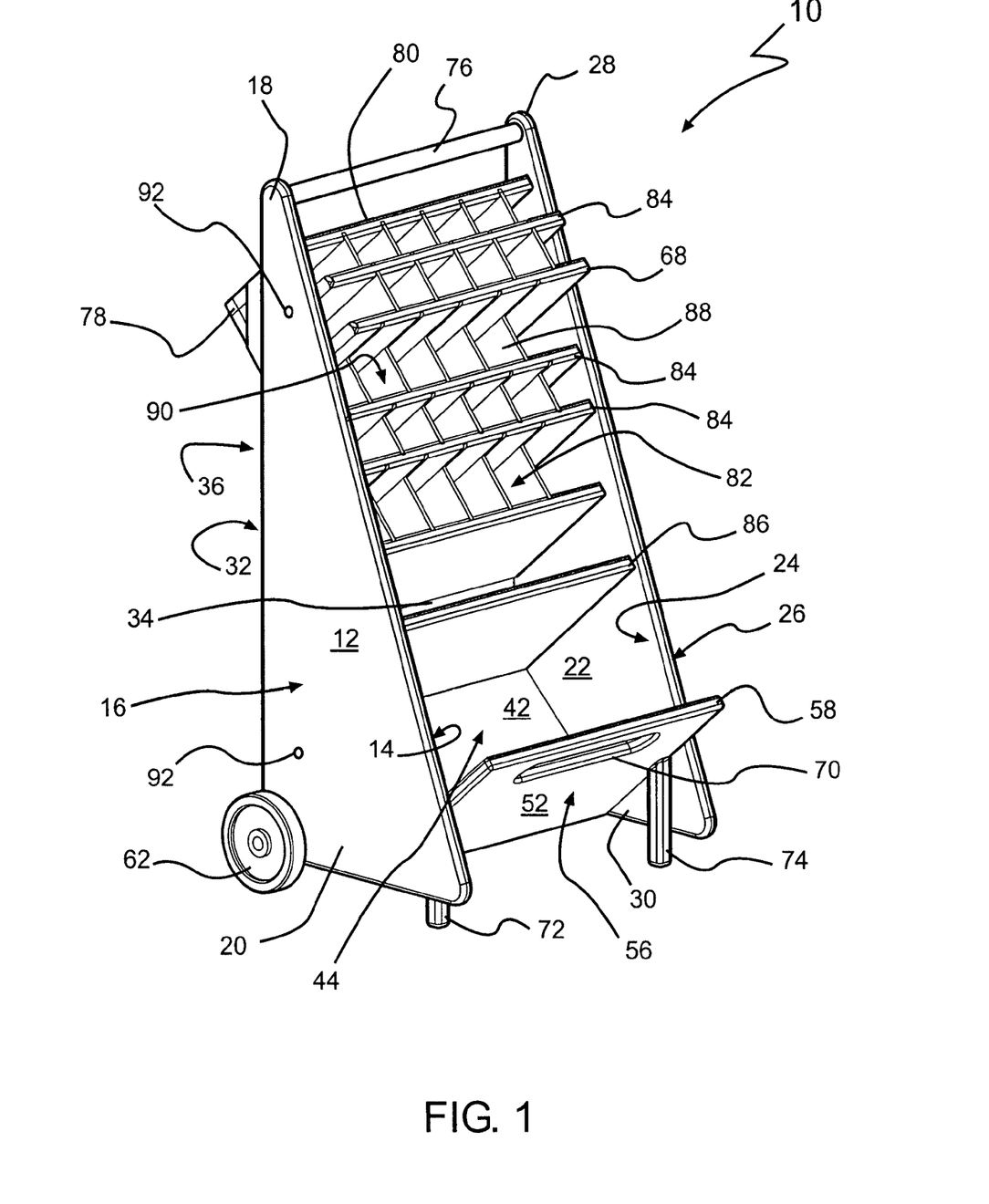
FIG. 1 is a perspective view of an exemplary embodiment of the portable tool box.
Figure 2:
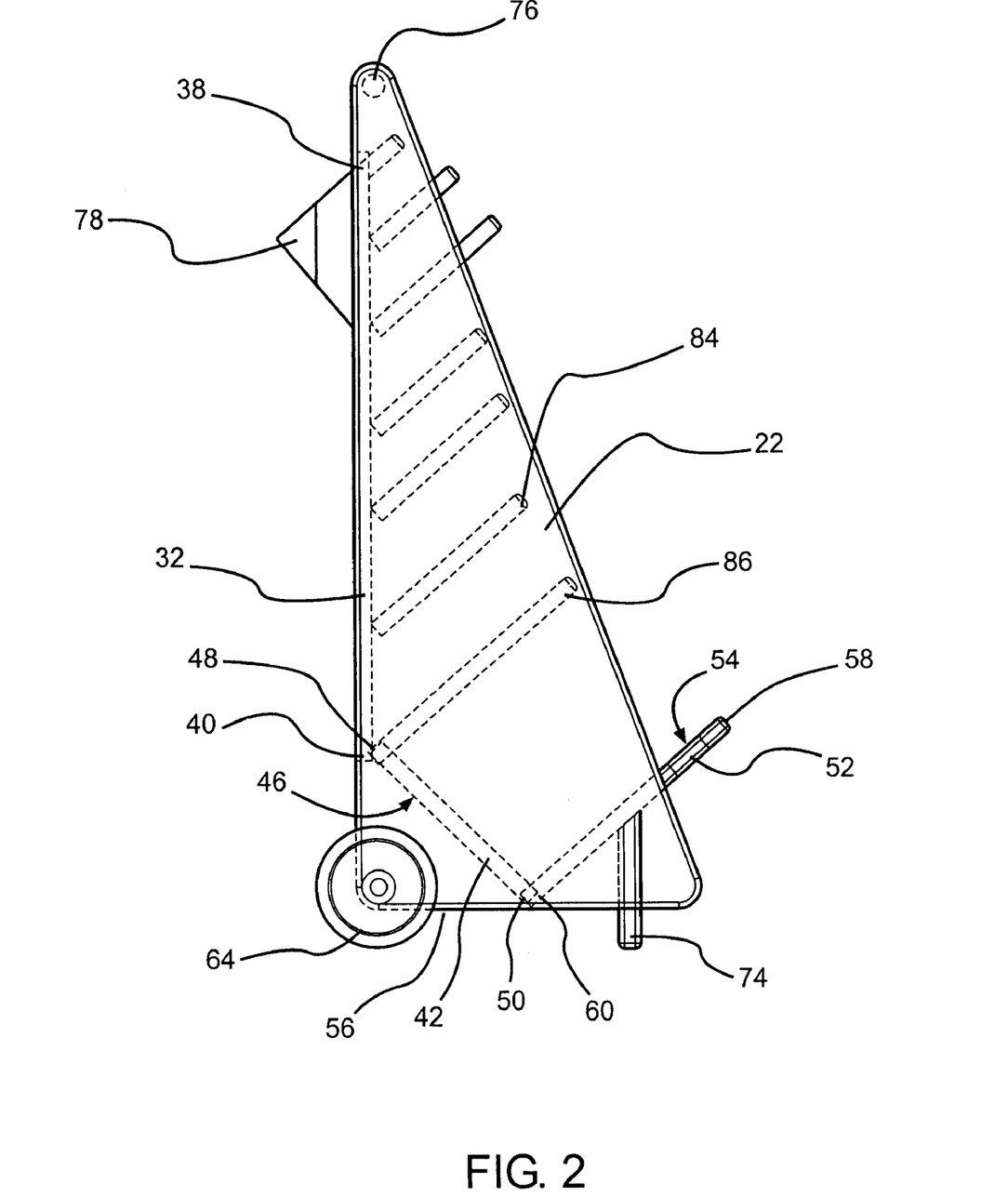
FIG. 2 is a side view of the exemplary embodiment of the portable tool box presented in FIG. 1.

Referring to FIG. 1, an exemplary embodiment of the portable tool box 10 in a vertical position is illustrated. FIG. 1 is a perspective view and FIG. 2 is a side view illustrating aspects of the interior. The portable tool box 10 includes a first side wall 12 having an interior side 14, an exterior side 16, a top 18, and a bottom 20 and a second side wall 22 having an interior side 24, an exterior side 26, a top 28, and a bottom 30. The first side wall 12 and the second side wall 22 are configured to be solid right triangles. The first side wall 12 and the second side wall 22 are coupled to a rear wall 32 having an interior side 34, an exterior side 36, a top 38, and a bottom 40.

A base wall 42 having an interior side 44, an exterior side 46, a top 48, and a bottom 50 is coupled to the rear wall 32, to the interior side 14 of the first side wall 12 and to the interior side 24 of the second side wall 22. The base wall 42 is coupled to the rear wall 32 at an angle of about 125° to about 140°, with about 135° preferred. A base 52 has an interior side 54, an exterior side 56, a top 58, and a bottom 60. The base 52 is coupled to the bottom 50 of base wall 42, to the interior side 14 of the first side wall 12 and to the interior side 24 of the second side wall 22. The base 52 is coupled to the bottom 50 of base wall 42 at an angle of about 35° to about 50°, with about 45° preferred. The coupling of these walls 12, 22, 32, 42 and the base 52 forms an interior and an open tool box.

Attached to the bottom 20 (i.e., near the base of the right angle) of the first side wall 12 and the bottom 30 (i.e., near the base of the right angle) of the second side wall 22 are wheels 62, 64. These wheels 62, 64 can be rotatably coupled directly to the first side wall 12 and second side wall 22, respectively, to rotate independently about an axis orthogonal to the plane of the first side wall 12 and second side wall 22. In the alternative, the wheels 62, 64 can be connected to each other via a rod 66 (see FIG. 5) such that the wheels 62, 64 are configured to rotate mutually. The wheels 62, 64 are configured to rotate for ease in transporting the portable tool box 10 to different locations. The wheels 62, 64 are also configured to be positioned at the bottoms 20, 30 of the side walls 12, 22, respectively, in order to provide the stability when the portable tool box 10 is in a vertical position. Further, the wheels 62, 64 are also configured to support the weight of the portable tool box 10 when the portable tool box 10 is in a horizontal position on a surface 68 (see FIG. 6). The wheels 62, 64 can be any conventional wheels that can be coupled to the portable tool box 10. The wheels 62, 64 can be any conventional wheel including, but not limited to, rubber, plastic, metal, and the like.

An opening (or void or via) 70 is formed in the base 52 for ease in lifting the portable tool box 10. Stabilizers 72, 74 are coupled to the base 52 and are configured to stabilize the portable tool box 10 when in a vertical position. The length of the stabilizers 72, 74 is dependent upon the size and type of wheels 62, 64, in order to ensure that the portable tool box 10 is stable when in the vertical position.

A handle 76 is disposed at the top 18 of the first side wall 12 and the top 28 of the second side wall 22 between the two walls 12, 22. The handle 76 is configured to allow a user to lift and pull the portable tool box 10. In an exemplary embodiment, the handle 76 is formed from a rod material.

Attached to the rear wall 32 of the portable tool box 10 is a foot (or support) 78. The foot 78 is configured to support the weight of the portable tool box 10 when the portable tool box 10 is in a horizontal position (see FIG. 6). The foot 78 can be separately attached to the rear wall 32 or it can be integral with the rear wall 32. The foot 78 can be comprised of the same material as the rear wall 32 or a separate material, as described further herein. It is contemplated that an extra cushion (or a cushioning device or a reinforcement device or a skid pad) can be coupled to the foot 78 to reinforce the material and to improve the durability. The shape can be any shape that can support the weight of the portable tool box 10, while providing stability to the portable tool box 10. The foot 78 should be designed to be durable and to support the weight of portable tool box 10.

A top portion (or top) 80 is coupled to the first side wall 12, second side wall 22 and rear wall 32 to create the interior 82 of the portable tool box 10. Shelves 84, 86 are disposed within the interior 82 of the portable tool box 10 at an angle of about 35° to about 50°, with an angle of about 45° preferred, to the rear wall 32. The desired angle is an angle to which the tools will be retained on the shelf and within the portable tool box. The shelves 84, 86 are disposed at this angle in order to retain the tools when the portable tool box 10 is in a vertical or a horizontal position. The angle of the shelves 84, 86 prohibits tools and other items from falling out when the portable tool box 10 is in use or being moved (or transported). The angle of the shelves also allows for easy access to the tools by the user since the tools are easy to see and to remove.

Any number of shelves 84, 86 can be disposed in the interior 82 depending upon the desired room between the shelves 84, 86. The shelves 84 can also have separators 88 coupled to the shelves 84 that are configured to create separate compartments 90 for holding different sized tools, nuts, bolts, fasteners, and any other items generally carried in a tool box. In one embodiment, a shelf 86 without separators 88 can be utilized to hold larger tools or boxes. The base 52 can also be utilized as a shelf.

In another embodiment, fasteners (or hooks or clips, and the like) 92 can be disposed on the exterior side 16 of the first side wall 12 and/or the exterior side 26 of the second side wall 22 for holding or hanging other tools (i.e., a level, a saw, etc.) or items. The fasteners 92 can be removably installed in the side walls, 12, 22 for ease in changing the location for accommodating different sized tools.

Figure 3:
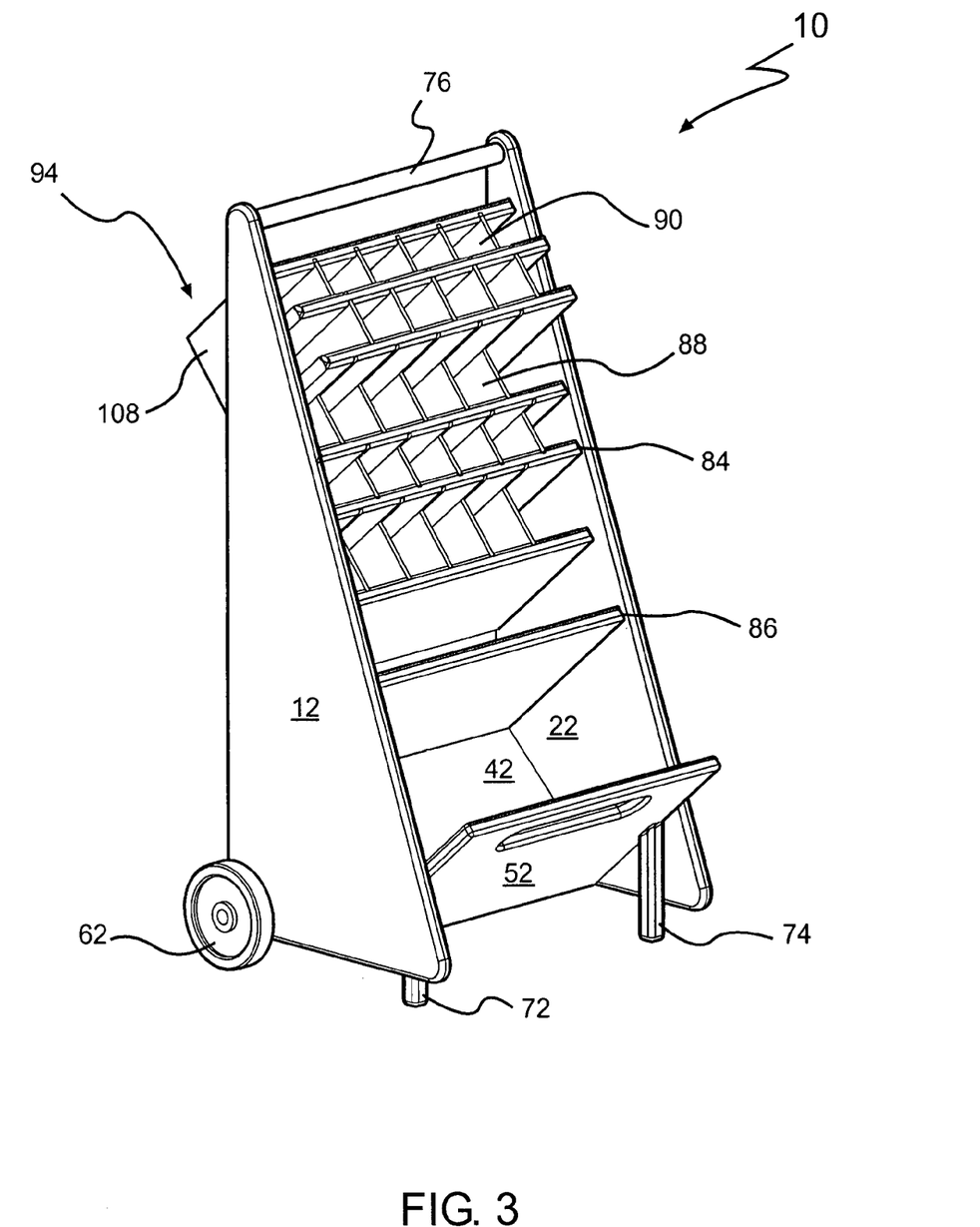
FIG. 3 is a perspective view of another exemplary embodiment of the portable tool box.
Figure 4:
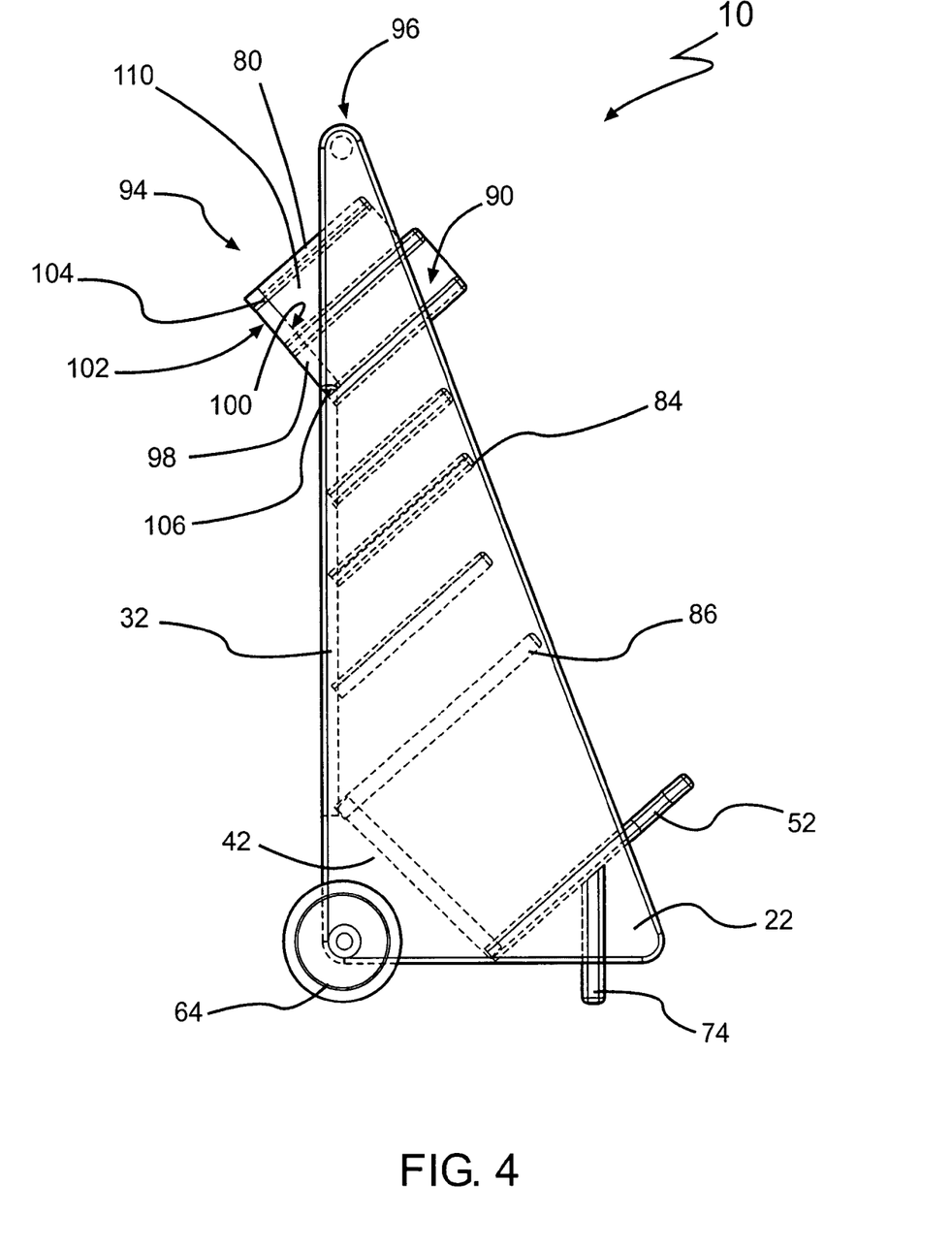
FIG. 4 is a side view of the exemplary embodiment of the portable tool box presented in FIG. 3.

Referring now to FIGS. 3 and 4, another exemplary embodiment of the portable tool box 10 in a vertical position is illustrated. FIG. 3 is a perspective view and FIG. 4 is a side view illustrating aspects of the interior. In this embodiment, the portable tool box 10 includes an extended section 94 of several compartments 90 near the top 96 of the portable tool box 10. This extended section 94 replaces the foot 78 of the first embodiment (FIGS. 1 and 2) by performing the same function as the foot 78.

The extended section 94 is formed by an extension 98 having an interior 100, an exterior 102, a top 104, and a bottom 106 and is coupled to the interior side 14 of the first side wall 12, the interior side 24 of the second side wall 22, and the top 38 of the rear wall 32. The extension 98 is also coupled to the top portion 80. First extension side wall 108 is coupled to extension 98, top portion 80 and first side wall 12. Second extension side wall 110 is coupled to extension 98, top portion 90 and second side wall 22. The coupling of the extension 98, extension side walls 108, 110, and the top portion 80 to the portable tool box 10 creates extra storage space. This extended section 94 allows for the inclusion of shelves 84, 86 and, potentially, separators 88 for the storage. The extended section 94 also provides a support for the portable tool box 10 when in the horizontal position (i.e., similar to the function of the foot 78 described above). As in the case of the foot 78, the extended section 94 can be reinforced with a durable material in order to withstand the normal use of the portable tool box 10.

In the preferred embodiment, the portable tool box 10 (including all the elements, i.e., the walls, bases, shelves, separators, handle, stabilizes, foot, etc.) is comprised of any type of wood, preferably a light weight, yet durable, wood. However, other materials are contemplated, including but not limited to, wood composites, metal, metal composites, metal alloys, plastic, plastic composites, and the like, and combinations thereof. It is contemplated that the elements of the portable tool box 10 can comprise several different materials depending upon the durability and function of the element. For example, the shelves may be a light weight wood while the separators may be a metal material, such as aluminum, metal alloys, and the like. It is also contemplated that the portable tool box 10 can comprise a frame that utilizes a canvas material (or other sturdy fabric) for the walls and shelves.

Figure 5:
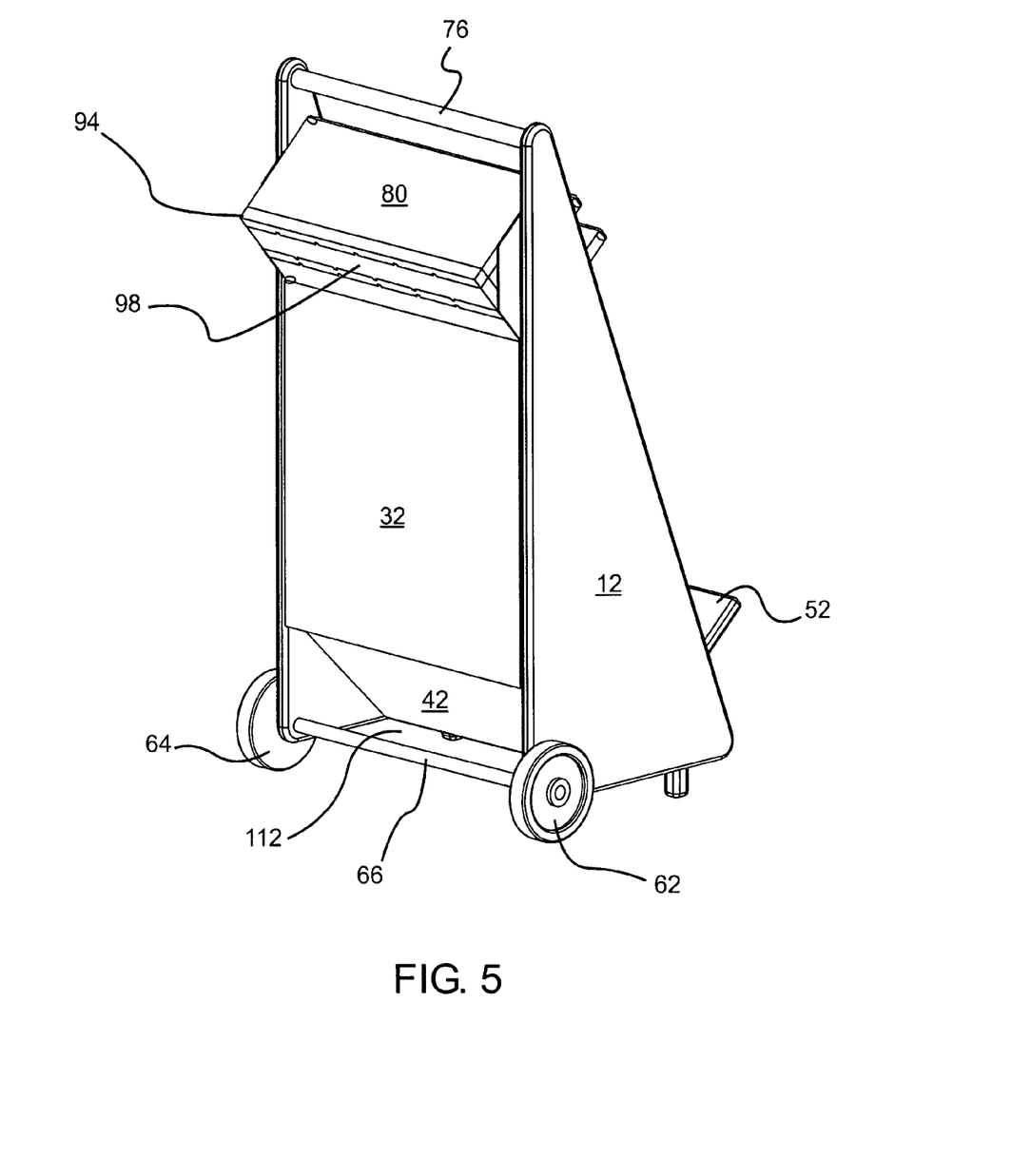
FIG. 5 is a rear view of the exemplary embodiment of the portable tool box presented in FIG. 3.
Figure 6:
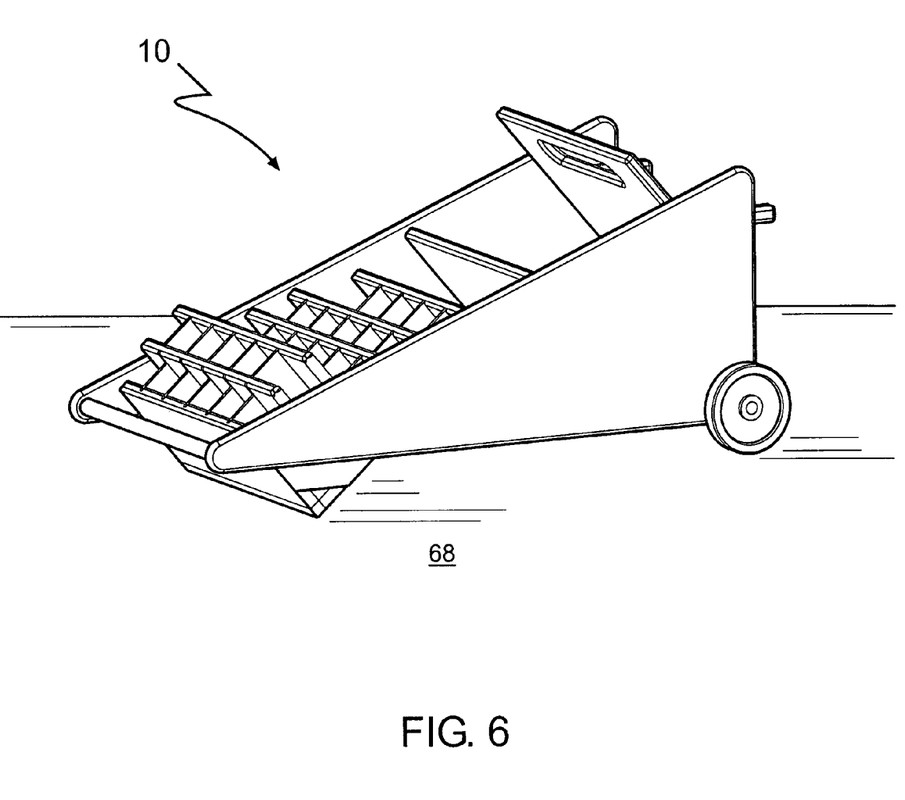
FIG. 6 is a perspective view of an exemplary embodiment of the portable tool box in a horizontal position.
Figure 7:
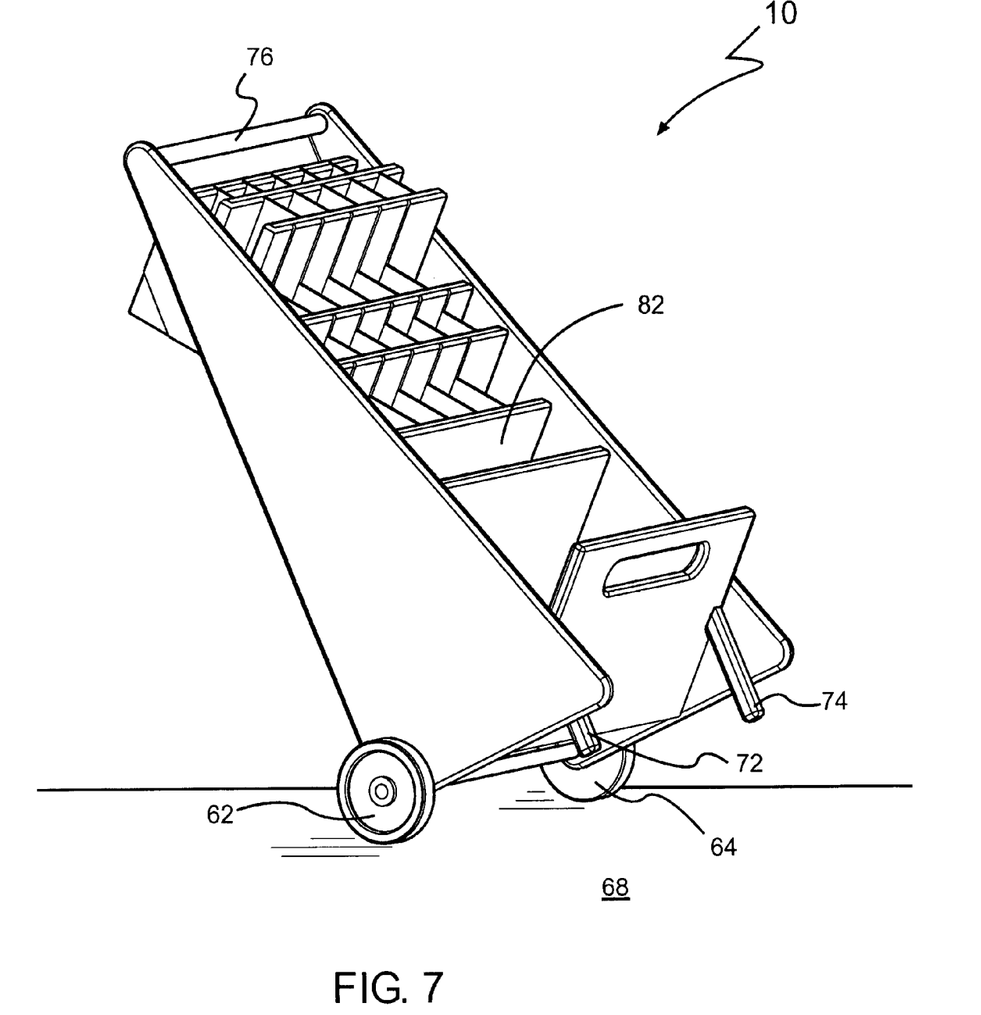
FIG. 7 is a perspective view of an exemplary embodiment of the portable tool box.

Referring now also to FIGS. 5, 6, and 7, a user can place tools and other necessary equipment within the interior 82 of the portable tool box 10. The user can easily transport the tools between job sites or rooms by rolling the portable tool box 10 on the wheels 62, 64. In use, the user grasps the handle 76 and pulls backward (i.e., away from the open portion of the portable tool box 10) such that the stabilizers 72, 74 are lifted off the ground. In some embodiments, the user can use his/her foot to push on the rod 66 in the area 112 below the rear wall 32 in order to transfer the weight of the portable tool box 10 to the wheels 62, 64. At this point, the weight of the portable tool box 10 shifts from being on both the stabilizers 72, 74 and the wheels 62, 64 to being only on the wheels 62, 64, as illustrated in FIG. 7. Now, the user can utilize the handle 76 to navigate the portable tool box 10 to the desired location via the rotating of the wheels 62, 64. Upon reaching the desired location, the user can either utilize the portable tool box 10 in the vertical position (FIGS. 1-5) or in the horizontal position (FIG. 6).

The present disclosure is a portable tool box that can be utilized in two positions by the user. The user can easily access tools from the tool box when in the standing (or vertical) position as well as in the lying down (or horizontal) position. The portable tool box allows the user to easily maneuver the tool box to a desired location and access tools from two convenient positions. Further the handle at the top and disposed in the base allow the user to easily lift the portable tool box to and from any elevated location (i.e., a truck bed, a second floor, a work bench, etc.). Additionally, the sturdy wheels and foot allow for proper support of the portable tool box.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention.

What is claimed is:
1. A portable tool box comprising:
a first side wall having an interior side and an exterior side;
a rear wall having an interior side opposite an exterior side and a top opposite a bottom, said rear wall coupled to said interior side of said first side wall;
a second side wall having an interior side opposite an exterior side and a top opposite a bottom, said rear wall coupled to an interior side of said second side wall
a handle disposed between a top of said first wall and a top of said second wall;
a base wall having an interior side opposite an exterior side and a top opposite a bottom, said base wall coupled to said bottom of said rear wall, to said interior side of said first side wall and to said interior side of said second side wall, said base wall coupled to said rear wall at an angle of about 45°;
a base having an interior side opposite an exterior side and a top opposite a bottom, said base coupled to said bottom of said base wall, to said interior side of said first side wall and to said interior side of said second side wall;
a top portion having an interior side opposite an exterior side coupled to said top of said rear wall, to said interior side of said first side wall and to said interior side of said second side wall;
an interior formed from said first side wall, said second side wall, said rear wall, said top portion, said base wall and said base;
a foot disposed to about said top of said rear wall, wherein the portable tool box is configured for use in a horizontal and a vertical configuration, said foot being configured to support weight of said portable tool box when said portable tool box is in said horizontal configuration upon a surface;
at least two wheels rotatably coupled to said bottom of said first side wall and said bottom of said second side wall, said at least two wheels configured to support said weight of said portable tool box;

at least one shelf disposed in said interior of said portable tool box, said at least one shelf is positioned at an angle of about 45°; and at least one stabilizer coupled to said portable tool box, said at least one stabilizer configured to stabilize said portable tool box when in a vertical position.

2. The portable tool box of claim 1, further comprising:

an extended section coupled to said top of said rear wall, said interior side of said first side wall, said interior of said second side wall, and said interior side of said top portion;

wherein said extended section replaces said foot; and wherein said extended section extends a depth of said at least one shelf.

3. The portable tool box of claim 1, further comprising:

an opening disposed in said base.

4. The portable tool box of claim 1, wherein the portable tool box comprises a material selected from the group consisting of wood, wood composites, metal, metal alloys, metal composites, plastic, plastic composites, and fabric.

5. The portable tool box of claim 1, further comprising:

at least one fastener disposed on said exterior side of at least one of said first side wall and said second side wall.

6. The portable tool box of claim 1, wherein said at least two wheels are independently coupled to the portable tool box.

7. The portable tool box of claim 1, wherein said at least two wheels are rotatably coupled between a rod, said rod coupled to the portable tool box.

8. The portable tool box of claim 1, wherein said first side wall and said second side wall are right triangles.

9. A method of using a portable tool box comprising:

grasping a handle of the portable tool box positioned vertically, the portable tool box including a first side wall having an interior side and an exterior side;

a rear wall having an interior side opposite an exterior side and a top opposite a bottom, said rear wall coupled to said interior side of said first side wall;

a second side wall having an interior side opposite an exterior side and a top opposite a bottom, said rear wall coupled to an interior side of said second side wall; said handle disposed between a top of said first wall and a top of said second wall;

a base wall having an interior side opposite an exterior side and a top opposite a bottom, said base wall coupled to said bottom of said rear wall, to said interior side of said first side wall and to said interior side of said second side wall, said base wall coupled to said rear wall at an angle of about 45°;

a base having an interior side opposite an exterior side and a top opposite a bottom, said base coupled to said bottom of said base wall, to said interior side of said first side wall and to said interior side of said second side wall;

a top portion having an interior side opposite an exterior side coupled to said top of said rear wall, to said interior side of said first side wall and to said interior side of said second side wall;

an interior formed from said first side wall, said second side wall, said rear wall, said top portion, said base wall and said base;

a foot disposed to about said top of said rear wall, said foot configured to support weight of said portable tool box when said portable tool box is horizontal upon a surface;

at least two wheels rotatably coupled to said bottom of said first side wall and said bottom of said second side wall, said at least two wheels configured to support said weight of said portable tool box;

at least one shelf disposed in said interior of said portable tool box, said at least one shelf is positioned at an angle of about 45°; and at least one stabilizer coupled to said portable tool box, said at least one stabilizer configured to stabilize said portable tool box when in said vertical position;

pulling on said handle to shift a weight of the portable tool box from said at least one stabilizer to said at least two wheels;

moving the portable tool box to a desired location having a surface; and moving the portable tool box to shift a portion of said weight to said foot, wherein said foot rests upon said surface.

10. The method of claim 9, wherein the portable tool box further comprises an extended section coupled to said top of said rear wall, said interior side of said first side wall, said interior of said second side wall, and said interior side of said top portion; wherein said extended section replaces said foot; and wherein said extended section extends a depth of said at least one shelf.

11. The method of claim 9, further comprising:

grasping said handle while grasping an opening in said base; and lifting the portable tool box from a surface.

12. The method of claim 9, further comprising:

placing a user's foot on a rod coupled between said at least two wheels; and pushing against said rod with said user's foot while said pulling on said handle.

13. The method of claim 9, wherein the portable tool box comprises a material selected from the group consisting of wood, wood composites, metal, metal alloys, metal composites, plastic, plastic composites, and fabric.

14. The method of claim 9, wherein the portable tool box comprises at least one fastener disposed on said exterior side of at least one of said first side wall and said second side wall.

15. A portable tool box comprising:

a rear wall coupled to a first side wall, a second side wall, and a base wall to form an interior and an exterior of said portable tool box, said base wall coupled at about 45 degree angle;

a base coupled to said base wall, said first side wall and said second side wall;

a top portion coupled to said rear wall, said first side wall and said second side wall;

a foot coupled to a top portion of said rear wall, wherein the portable tool box is configured for use in a horizontal and a vertical position, said foot being configured to support weight of said portable tool box when said portable tool box is in said horizontal configuration upon a surface;

at least two wheels rotatably coupled to said first side wall and said second side wall, said at least two wheels configured to support said weight of said portable tool box;

at least one shelf disposed in said interior of the portable tool box, said at least one shelf is positioned at an angle of about 45°; and at least one stabilizer coupled to said portable tool box, said at least one stabilizer configured to stabilize said portable tool box when in said vertical position.

16. The portable tool box of claim 15, further comprising:
an extended section coupled to a top of said rear wall, said first side wall, said second side wall, and said top portion;
wherein said extended section replaces said foot; and
wherein said extended section extends to a depth of said at least one shelf.

17. The portable tool box of claim 15, further comprising:
an opening disposed in said base.

18. The portable tool box of claim 15, wherein the portable tool box comprises a material selected from the group consisting of wood, wood composites, metal, metal alloys, metal composites, plastic, plastic composites, and fabric.

19. The portable tool box of claim 15, further comprising:
at least one fastener disposed on said exterior side of at least one of said first side wall and said second side wall.

20. The portable tool box of claim 1, wherein said at least two wheels are rotatably coupled between a rod, said rod coupled to the portable tool box.

* * * * *